(12) United States Patent
Bell et al.

(10) Patent No.: US 7,397,506 B2
(45) Date of Patent: Jul. 8, 2008

(54) REDUCING THE EFFECT OF NOISE IN AN IMAGING SYSTEM

(75) Inventors: Cynthia Bell, Chandler, AZ (US); Kannan Raj, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 10/855,293

(22) Filed: May 27, 2004

(65) Prior Publication Data

US 2004/0212704 A1    Oct. 28, 2004

Related U.S. Application Data

(63) Continuation of application No. 09/130,580, filed on Aug. 6, 1998, now abandoned.

(51) Int. Cl.
H04N 9/64 (2006.01)
H04N 5/217 (2006.01)

(52) U.S. Cl. .................. 348/243; 348/241

(58) Field of Classification Search ........... 348/242, 348/243, 244, 246
See application file for complete search history.

(56) References Cited

U.S. PATENT DOCUMENTS

| 5,623,306 | A | * | 4/1997 | Kajihara et al. ........... 348/243 |
| 5,753,906 | A | * | 5/1998 | Gennetten ............... 250/208.1 |
| 5,818,898 | A | * | 10/1998 | Tsukamoto et al. ....... 378/98.8 |
| 5,926,214 | A |   | 7/1999 | Denver et al. ............. 348/241 |
| 6,078,037 | A |   | 6/2000 | Booth, Jr. ............... 250/208.1 |
| 6,101,287 | A |   | 8/2000 | Corum et al. ............. 358/463 |
| 6,144,408 | A |   | 11/2000 | MacLean ................. 348/241 |
| 6,433,822 | B1 |   | 8/2002 | Clark et al. .............. 348/241 |
| 6,642,956 | B1 | * | 11/2003 | Safai ...................... 348/222.1 |

* cited by examiner

*Primary Examiner*—David Ometz
*Assistant Examiner*—Luong T Nguyen
(74) *Attorney, Agent, or Firm*—Trop, Pruner & Hu, P.C.

(57) ABSTRACT

A method to reduce the effect of noise on a pixel sensor element includes accumulating charge during an image capture operation (the accumulated charge representing a combination of noise and image), and discharging the accumulated charge for a predetermined time to generate a pixel sensor signal. The act of discharging may be passive or active.

8 Claims, 6 Drawing Sheets

REDUCING THE EFFECT OF NOISE IN AN IMAGING SYSTEM

REFERENCE TO EARLIER APPLICATION

This application is a continuation of application Ser. No. 09/130,580, filed Aug. 6, 1998 now abandoned, entitled "Reducing the Effect of Noise in an Imaging System" by Kannan Raj and Cynthia Bell.

BACKGROUND

The invention relates to reducing the effect of noise during image capture operations in a digital imaging system.

Figure 1:
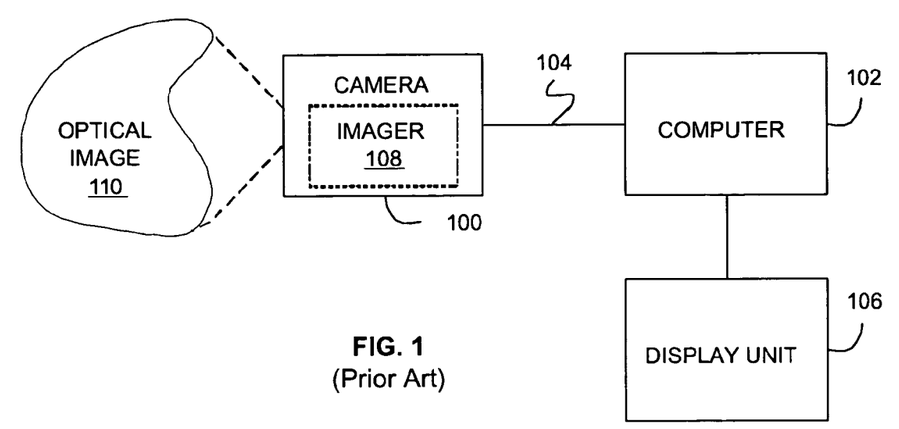
FIG. 1 shows a prior art digital imaging system.

Referring to FIG. 1, a common digital image processing system includes camera 100, computer 102 coupled to camera 100 by communication link 104, and display unit 106. Computer system 102 may be a personal computer (PC). Communication link 104 may be a serial bus such as the universal serial bus (USB). Display unit 106 may be any convenient display device such as a cathode ray tube (CRT) or liquid crystal display (LCD).

Camera 100 may use imager 108 to generate an electrical representation of optical image 110. To accomplish this, imager 108 may include a sensor having an array of photon sensing elements. During an integration time or interval, each sensor element accumulates light energy from that portion of optical image 110 that is focused on it by camera 100 optics (not shown in FIG. 1). At the expiration of the integration interval, sensor elements indicate the intensity of the received light energy by, for example, an analog voltage signal. Camera 100 typically processes the indications from sensor elements to form a frame of digital data which may then be stored in memory internal to camera 100 (not shown in FIG. 1), and/or transferred to computer 102.

Typically, the frame of data does not indicate an exact duplicate of optical image 110 due to imperfections introduced by camera 100. As examples, camera 100 may introduce optical distortion and noise. One type of noise may be dark current noise. Dark current noise may be defined as sensor element current that is present even when the sensor element is not illuminated. Dark current noise tends to reduce the captured image's dynamic range and signal to noise ratio (SNR) and places a limit on sensor element integration time. Dark current also tends to increase as the temperature increases, rendering many cameras substantially unusable in high temperature environments. Another type of noise is offset noise. Offset noise may manifest itself as increased signal values (e.g., voltage or analog to digital conversion counts) which do not represent a feature of the captured image. Offset noise may be introduced by signal amplification and analog to digital conversion circuitry.

Some cameras attempt to cancel out dark current noise from a sensor element by subtracting a predetermined noise level from the intensity that is indicated by the sensor element. The predetermined noise level may be determined from, for example, an extra sensor element that is not exposed to light during image capture operations. Similarly, some cameras attempt to compensate for offset noise by subtracting a predetermined value from analog to digital converter output. Neither of these methods correct for actual dark current noise or offsets in a manner that improves the dynamic range of the captured images.

Thus, it would be beneficial to provide a mechanism to automatically and accurately compensate for the noise introduced by a digital camera during image capture operations.

SUMMARY

In one embodiment, the invention provides a method to process pixel sensor signals. The method may include accumulating charge during an image capture operation, the accumulated charge having a noise portion and an image portion, and discharging at least some of the noise portion for a predetermined time to generate a pixel sensor signal. The act of discharging may be passive or active. Embodiments of the inventive method may be stored in any media that is readable and executable by a programmable control device such as a computer system.

In another embodiment, the invention provides an imaging system having a memory, a programmable control device coupled to the memory, and an imager coupled to the memory and the processor. The imager may include a plurality of pixel sensor elements and a control circuit adapted to generate a first signal to initiate an image capture operation resulting in the accumulation of charge by a pixel sensor element, a second signal to discharge a portion of the accumulated charge, and a third signal to initiate further processing of sensor output signals.

DETAILED DESCRIPTION

Techniques to reduce the effect of noise in an imaging system are described. While the following embodiments of this inventive concept are described in terms of a portable personal computer (PC) camera, they are illustrative only and are not to be considered limiting in any respect.

Figure 2:
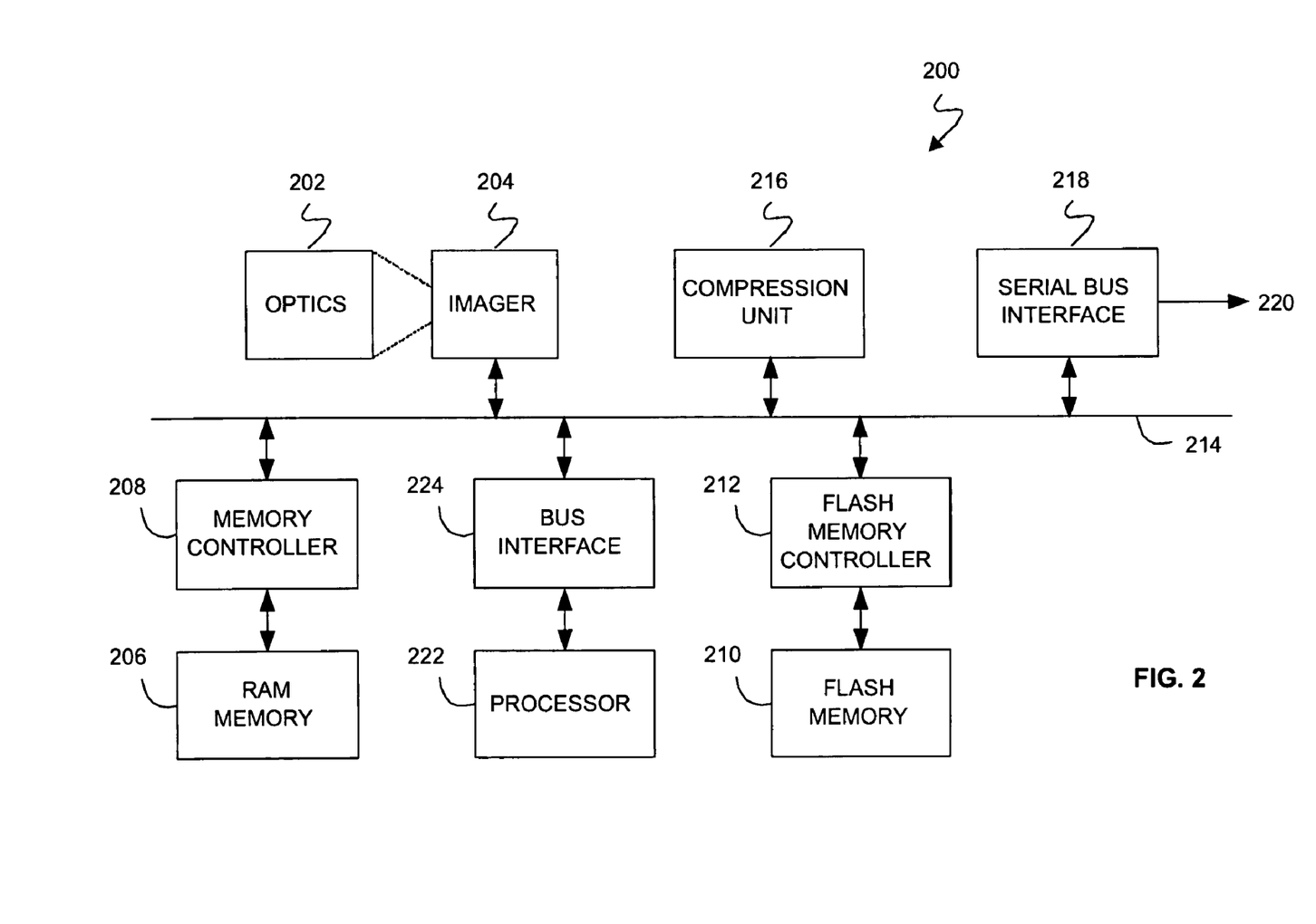
FIG. 2 shows a digital camera in accordance with one embodiment of the invention.

Referring to FIG. 2, a digital portable PC camera 200 in accordance with one embodiment of the invention may include optics unit 202 to focus an optical image onto the focal plane of imager 204. Image data (e.g., frames) generated by imager 204 may be transferred to random access memory 206 (through memory controller 208) or flash memory 210 (through memory controller 212) via bus 214. In one embodiment of the invention RAM memory 206 is a nonvolatile memory.

Camera 200 may also include compression unit 216 that interacts with imager 204 to compress the size of a generated frame before storing it in access memory (RAM 206 and/or flash memory 210). To transfer a frame of data to a computer, camera 200 may include serial bus interface 218 to couple camera memory (RAM 206 and flash memory 210) to serial bus 220. One illustrative serial bus is the universal serial bus (USB).

Camera 200 may also include processor 222 coupled to bus 214 via bus interface unit 224. In some embodiments, processor 222 interacts with imager 204 to adjust image capture parameters to reduce the effect of noise (e.g., dark current noise and offset noise) of the captured image or frame. Illustrative processors 222 include the MCS 296 family of microcontrollers manufactured by Intel Corporation.

Figure 3:
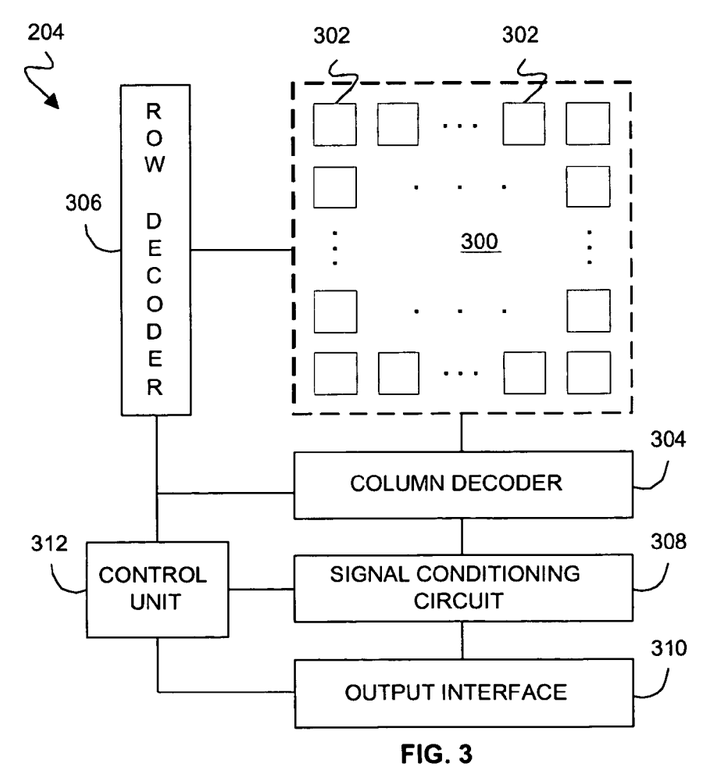
FIG. 3 shows one embodiment of the imager of FIG. 2.

Referring to FIG. 3, imager 204 may include a rectangular grid or array 300 of photon sensing elements 302 (pixel sensors). This arrangement allows column and row decoders, 304 and 306 respectively, to selectively retrieve indications from sensors 302. In one embodiment, sensor array 300 is a 768×576 array of complementary metal oxide semiconductor (CMOS) active pixel sensors. Decoders 304 and 306 route the selected indications to signal conditioning circuit 308 which may, among other functions, amplify and digitize the received signals. Signal conditioning circuit 308 may also furnish the resultant data signals to output interface 310 which includes circuitry for interfacing imager 204 to bus 214. Control unit 312, through circuitry such as state machines and timers, may coordinate and control the scanning (e.g., selection by row and column decoders 306 and 308) of pixel sensor 302 indications, their subsequent processing by signal conditioning circuit 308, and their transmission to other elements of camera 200 through output interface 310.

Camera operations may be divided into two phases: a normal phase and a calibration phase. During the normal or image capture phase, each pixel sensor 302 accumulates light energy from that portion of an image that is focused on it by optics 202 for a period of time referred to as the integration time or interval. At the expiration of the integration interval, pixel sensors 302 indicate the intensity of the received light energy by, for example, an analog voltage signal. Control circuit 312 routes the pixel sensor indications through column and row decoders 304 and 306 to signal conditioning circuit 308 where they may be amplified and digitized to form a frame—digital data signals representing the captured image. A frame may be compressed by compression unit 216 and transmitted to memory (e.g., RAM memory 206 or flash memory 210), and/or a computer system via serial bus interface 218 and serial bus 220. In general, the calibration phase is the time during which camera parameters are set. Example parameters include pixel sensor integration time, pixel sensor signal gain, and illuminant determination. Typically, the calibration phase occurs before optics 202 allow light to pass from an image to imager 204.

Figure 4:
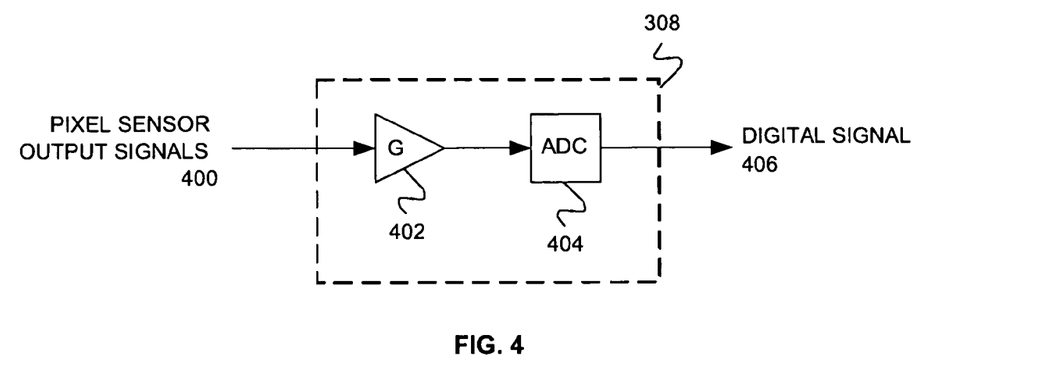
FIG. 4 shows one embodiment of the signal conditioning unit of FIG. 3.

Referring to FIG. 4, pixel sensor output signal 400 may be amplified (by one or more gain units 402) and digitized (by one or more analog to digital converters 404) by signal conditioning circuit 308 to generate digital signal 406. In a dark capture environment, such as during calibration, pixel sensor output signal 400 represents pixel sensor noise (e.g., dark current noise). Further, as pixel sensor output signal 400 is processed by signal conditioning unit 308, additional noise in the form of, for example, offset noise may be introduced by gain element 402 and analog to digital converter 404. Thus, in a dark capture environment, the value of digital signal 406 represents imager noise.

It has been found that digital signal 406 (see FIG. 4), generated during calibration or dark capture conditions, may be approximated by:

$$\text{Value} \approx [\alpha_1 + (\beta_1 T_{int} G)] + \tau[\alpha_2 + (\beta_2 T_{int} G)]. \quad \text{EQ. 1}$$

Here: Value represents the digital output (count value) from analog to digital converter 404, i.e., digital signal 406; $T_{int}$ represents pixel sensor integration time; G represents signal gain (e.g., from gain element 402); $\tau$ represents that interval of time during which charge (e.g., voltage) associated with imager noise (e.g., pixel sensor dark current), is allowed to bleed, discharge, or decay; and $\alpha_1$, $\alpha_2$, $\beta_1$, and $\beta_2$ which are constants. Capturing a sequence of four dark images provides the necessary data to solve for $\alpha_1$, $\alpha_2$, $\beta_1$, and $\beta_2$ in EQ. 1. With $\alpha_1$, $\alpha_2$, $\beta_1$, and $\beta_2$ known, a desired dark digital signal value 406 may be selected and a value for $\tau$ may be established.

Over some ranges of G and $\tau$, the relationships between $\beta$ and G and/or $\beta$ and $T_{int}$ may not be identical to that shown in EQ. 1. In these cases it may be possible to represent $\beta_1$ and/or $\beta_2$ as a combination of functions. For example, $\beta_1$ may be divided into a new constant times a function of gain, e.g., $\beta_{1a} \times f(G)$, and another new constant times a function of $T_{int}$, e.g., $\beta_{1b} \times g(T_{int})$. Similarly, $\beta_2$ may be divided into a new constant times a function of gain, e.g., $\beta_{2a} \times h(G)$, and another new constant times a function of $T_{int}$, e.g., $\beta_{2b} \times k(T_{int})$—f(), g(), h(), and k() are functional notation representing an empirically determined relationship (such as product, division, or power functions). In these cases, there may be more than four unknown parameters and, thus, more than four dark calibration images may be needed. In addition, over some ranges of $\tau$ the second element of EQ. 1 may not be linear, $\tau[\alpha_2 + (\beta_2 T_{int} G)]$. In these cases it may be possible to represent the empirically determined relationships in linear form using known techniques. For example, exponential, hyperbolic, and power functions are easily converted into a linear form relationship.

Figure 5:
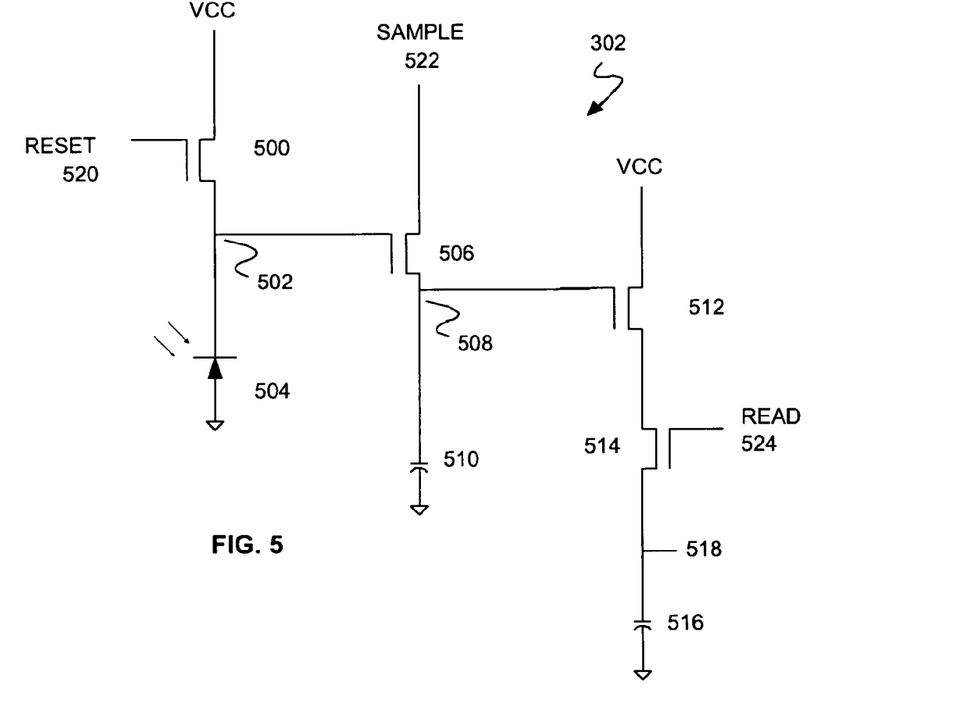
FIG. 5 shows a schematic of an active pixel sensor in accordance with one embodiment of the invention.

Before describing one embodiment of the invention, it is illustrative to review the basic operation of CMOS pixel sensor elements. Referring to FIG. 5, pixel sensor 302 may include, transistor 500, sample node 502, a photosensitive element such as photodiode 504, transistor 506, storage node 508, storage capacitor 510, transistors 512 and 514, output capacitor 516, and output node 518. Signals RESET 520, SAMPLE 522, and READ 524 control the operation of sensor element 302 and may be generated by control unit 312 as a result of its own operation or at the bequest of, for example, processor 222. Transistors 500, 506, 512, and 514 may, in one embodiment, be n-channel CMOS field effect transistors. Voltage VCC may be a positive supply voltage such as, for example, 3.3 volts.

Prior to capturing an image, sample node 502 may be initialized with a positive initialization voltage (VCC) by briefly asserting (driving high, for example) RESET signal 520. After a specified time, RESET signal 520 is deasserted (driven low, for example) and SAMPLE signal 522 is asserted to initiate pixel sensor 302 integration. Asserting SAMPLE signal 522 activates transistor 506, selectively coupling sample node 502 to storage node 508 allowing storage capacitor 510 to accumulate charge from sample node 502. During normal phase operations, part of the accumulated charge may represent sensor noise (e.g., dark current), and part of the accumulated charge may represent the image being captured. During dark image capture operations during the calibration phase, the accumulated charge typically represents sensor noise. To transfer the analog voltage at storage node 508 (following deassertion of SAMPLE signal 522) to output node 518, transistor 514 may be activated by READ signal 524 (READ signal 524 may be generated by row decoder 306). Because transistor 512 is arranged in a common source configuration, the voltage signal at storage node 508 is coupled to output node 518 when READ signal 524 is asserted (i.e., when transistor 514 is activated).

Figure 6:
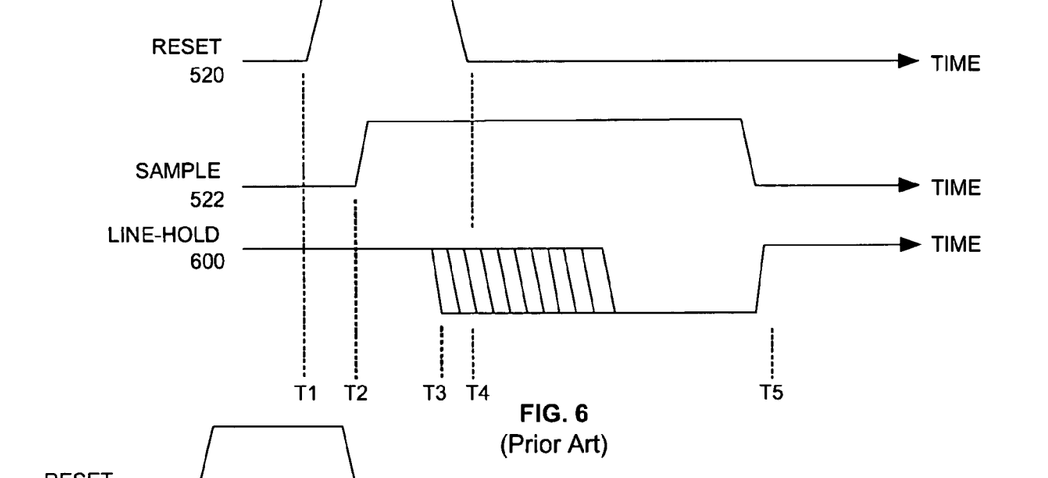
FIG. 6 shows pixel sensor control signals in accordance with conventional camera operations.

A conventional sequence of signals used to control a pixel sensor during image capture operations (during dark or normal imaging) is shown in FIG. 6. At time T1, RESET signal 520 is asserted to initialize sample node 502. At time T2, SAMPLE signal 522 is asserted tending to pull storage node 508 voltage toward VCC. At time T4, RESET signal 520 is deasserted, turning off transistor 500 and allowing storage capacitor 510 to integrate the current discharged by photodiode 504. (If a normal image is being captured, photodiode 504 is discharged in proportion to the amount of light energy impinging on the pixel sensor, plus any leakage current due to noise. If a dark image is being captured, the integrated current represents pixel sensor noise.) At time T5, SAMPLE signal 522 is deasserted to terminate integration—integration time is that interval between T4 and T5. At time T3, LINE-HOLD signal 600 is deasserted (e.g., driven low) and, at time T5 LINE-HOLD 600 signal is reasserted to begin pixel sensor read out operations. The LINE-HOLD signal 600 is a control signal that may be generated by control unit 312 which initiates sensor array 300 read operations: when LINE-HOLD signal 600 transitions from a low-state to a high-state at time T5 (i.e., is asserted), row decoder 306 generates a series of READ signals 524 to initiate read operations from pixel sensor 302—one row of pixel sensors 302 at a time from array 300. As illustrated in FIG. 6, there is essentially no time delay between the end of pixel sensor integration time (deassertion of SAMPLE signal 522) and the initiation of pixel array read operations trigged by the rising edge of LINE-HOLD signal 600 (in practice, there may be some time, in the range of a few to a few tens of microseconds).

Figure 7:
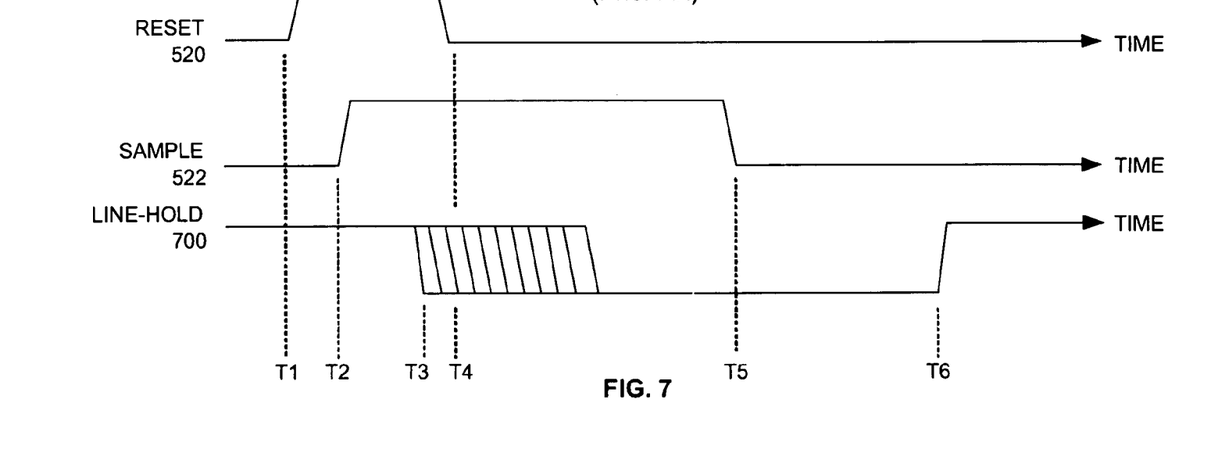
FIG. 7 shows pixel sensor control signals in accordance with one embodiment of the invention.

In contrast, a sequence of signals used to control pixel sensor 302 in accordance with one embodiment of the invention is shown in FIG. 7. At time T1 RESET signal 520 is asserted to initialize sample node 502. At time T2 SAMPLE signal 522 is asserted tending to pull storage node 508 voltage toward VCC. At time T4 RESET signal 520 is deasserted, turning off transistor 500 and allowing storage capacitor 510 to integrate the current discharged by photodiode 504. At time T5 SAMPLE signal 522 is deasserted to terminate integration. At time T3, LINE-HOLD signal 700 is deasserted (driven low, for example) and, at time T6, LINE-HOLD signal 700 is reasserted to signify that pixel sensor data may be read from sensor array 300. In contrast to prior techniques, LINE-HOLD signal 700 is delayed from time T5 (termination of pixel sensor integration) until time T6. This delay may allow time for current to bleed, discharge, or decay off storage capacitor 510. By selectively choosing the proper delay time, the amount of current discharged from storage capacitor 510 may substantially compensate for imager noise. In this approach, additional noise compensation circuitry may not be needed, resulting in a simpler and more cost effective camera 200.

Figure 8:
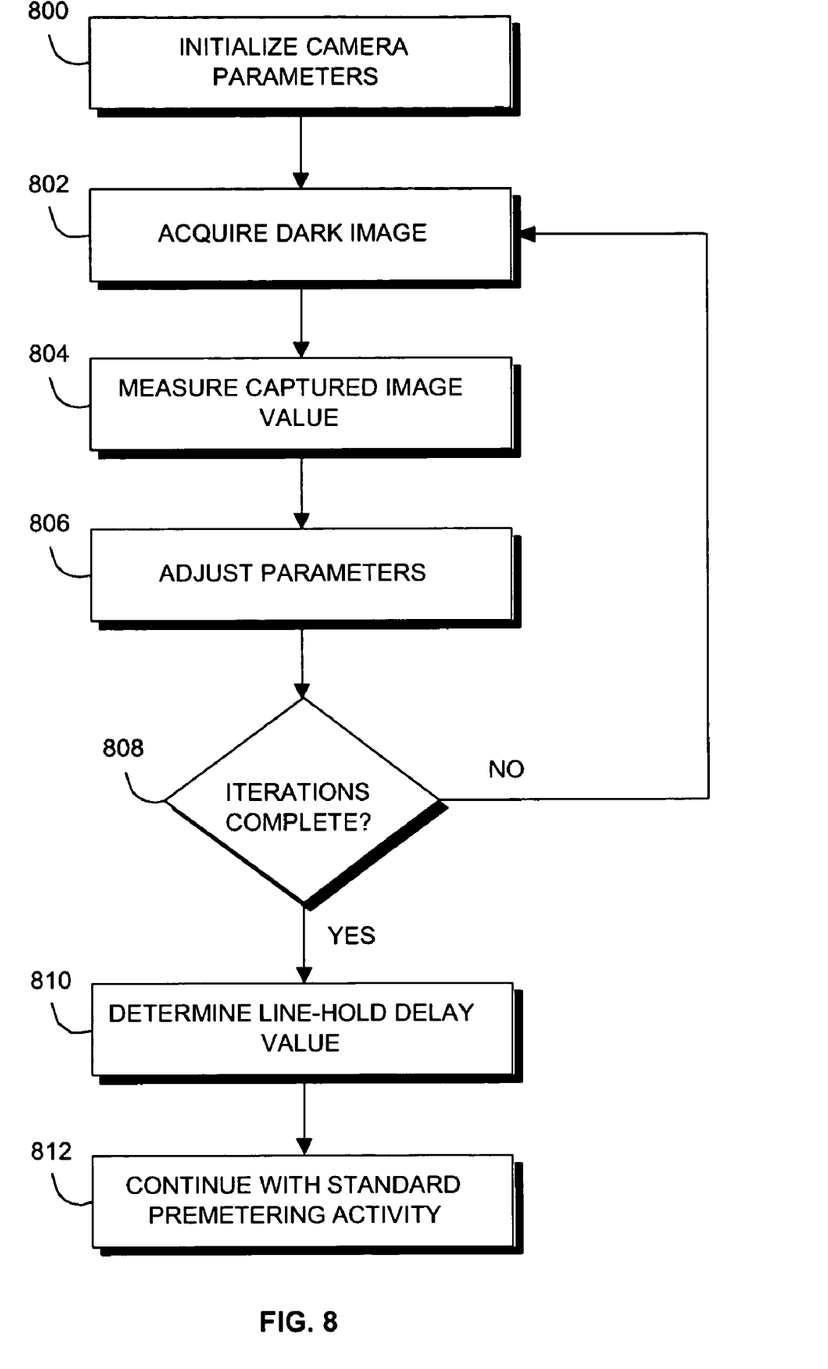
FIG. 8 shows a method to determine a signal delay time in accordance with one embodiment of the invention.

In one embodiment of the invention, an iterative technique to automatically and adaptively compensate for camera noise by adjusting line-hold delay time is shown in FIG. 8. To begin, camera parameters such as pixel sensor signal gain (G), integration time ($T_{int}$), and line-hold delay ($\tau$) values are initialized (block 800). In addition, a control counter may be initialized to zero. In one embodiment of camera 200 (where processor 222, for example, an 80296 microcontroller executing at 12 megahertz), a typical initialization value for gain is between 3 and 4, a typical initialization value for integration time is between 1 and 100 milliseconds (ms), and a typical initialization value for line-hold delay time is zero.

Following initialization, a dark image is captured (block 802) and the resulting signal value ("value" in EQ. 1) is determined (block 804). Next, the control counter value is incremented and the values for gain, integration time, and line-hold delay time may be adjusted (block 806). If the control counter value indicates that four dark images have not yet been captured (the "no" prong of diamond 808), processing continues at block 802. If the control counter value indicates that four dark images have been captured (the "yes" prong of diamond 808), EQ. 1 may be used to determine values for constants $\alpha_1$, $\alpha_2$, $\beta_1$, and $\beta_2$. With these values, a desired "value" (representing image capture offset) may be specified which may then be used to determine a value for line-hold delay time (block 810). The value so determined may be used during normal image capture operations. Following line-hold delay determination, conventional premetering operations may continue (block 812).

In general, any combination of parameter values that result in four independent dark images (each of which result in non-zero noise accumulation) may be used to solve for the four variables in EQ. 1. It is also beneficial to select parameter values that are sufficiently different so that the observed noise values span a range sufficient to give precision to the calculated parameters. For example: the first dark image may be captured with a gain (G) of 3.2, an integration time ($T_{int}$) of 100 ms, and a delay time ($\tau$) of zero; the second dark image may be captured with a gain of 4.0, an integration time of 2.5 ms, and a delay time of zero; the third dark image may be captured with a gain of 4.0, an integration time of 2.5 ms, and a delay time of 50 microseconds (µs); and the fourth dark image may be captured with a gain of 4.0, an integration time of 2.5 ms, and a delay time of 500 µs.

Typical camera offset values (406 in FIG. 4), using zero line-hold delay times, may be between approximately 40 and 60 for 8-bit ADCs (see 404 in FIG. 4), and between approximately 160 and 240 for 10-bit ADCs. With non-zero line-hold delay times in accordance with the invention (between approximately 0.001 ms and 10 ms), camera offset values may be reduced to approximately 5 for 8-bit ADCs and 20 for 10-bit ADCs.

Figure 9:
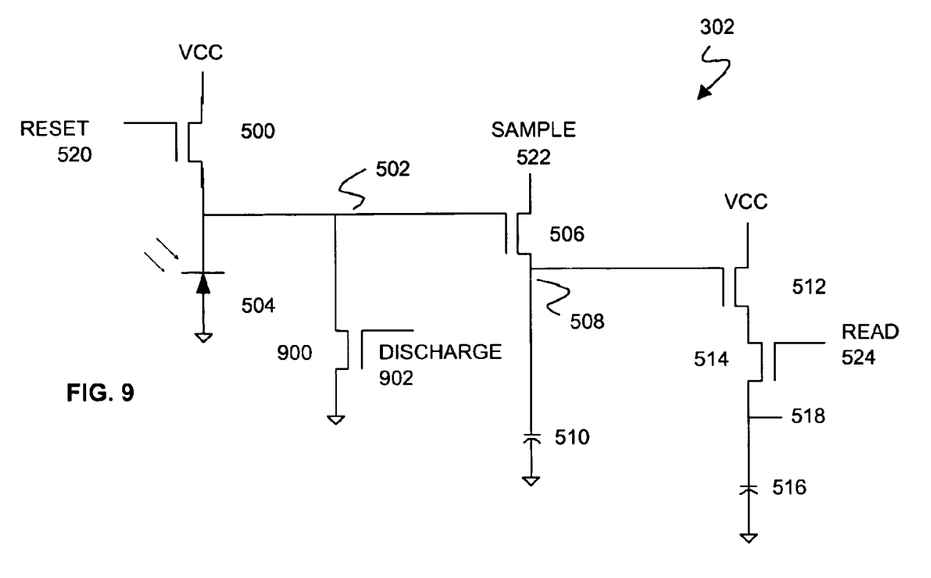
FIG. 9 shows a schematic of an active pixel sensor in accordance with another embodiment of the invention.

In another embodiment of the invention, sensor noise may be reduced by actively adjusting the accumulated charge at sample node 502. Referring to FIG. 9 for example, transistor 900 may be used to actively control the amount of charge accumulated at sample node 502. By selectively asserting DISCHARGE signal 902, transistor 900 may reduce the amount of charge (e.g., voltage) present at sample node 502. Conceptually, this is similar to allowing the charge at storage node 508 to decay by extending the (line-hold delay) time between completion of pixel sensor integration and the sequencing of the pixel sensor indications to signal conditioning circuit 308 (see FIG. 7). This alternative method differs from the passive mechanism of FIGS. 7 and 8 in that the voltage discharge operation is active—DISCHARGE signal 902 selectively activates transistor 900 to discharge, bleed, or leak voltage from sample node 502 to ground.

Figure 10:
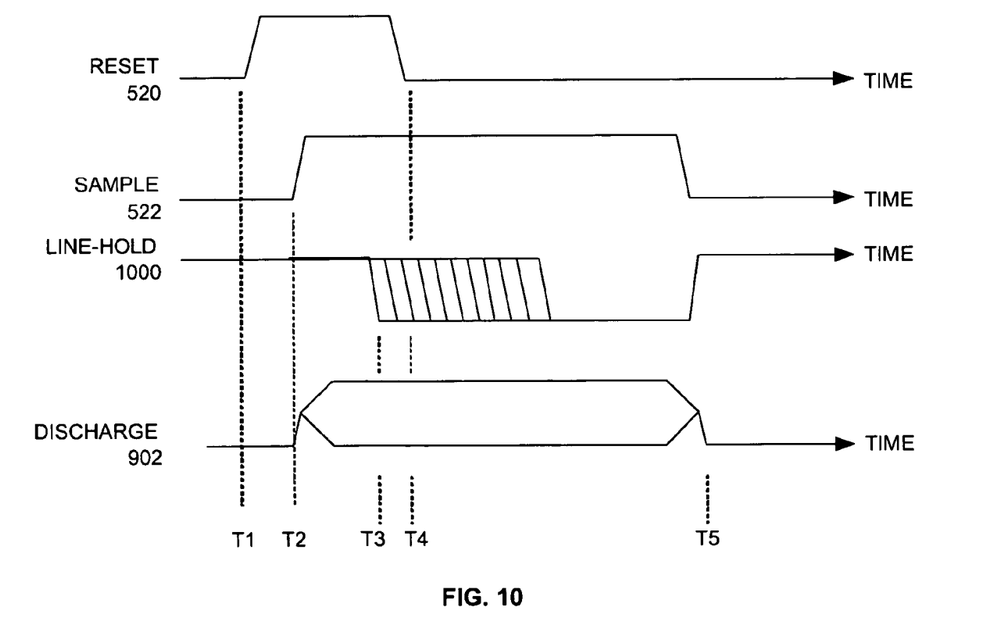
FIG. 10 shows pixel sensor control signals in accordance with another embodiment of the invention.

As shown in FIG. 10, DISCHARGE signal 902 may be asserted at substantially any time before LINE-HOLD 1000 signal is reasserted at time T5. That is, before sensor array 300 begins to have its pixel sensor indications read (e.g., routed to signal conditioning circuit 308 by row and column decoders 306 and 308). In this embodiment, the approach of capturing multiple dark images to determine a set of parameters as described above (see EQ. 1 and FIG. 8) is equally applicable. Now, however, $\tau$ in EQ. 1 represents the amount of time to activate transistor 900, and block 810 in FIG. 8 becomes "determine discharge time."

In yet another embodiment, transistor 902 may be coupled between storage node 508 and ground. In this configuration, the charge/voltage at storage node 508 may be actively controlled following completion of integration time and before READ signal 524 is asserted.

The techniques described above and in FIGS. 7, 8, 9, and 10 may be performed during each camera power-up operations or before each image is captured (e.g., during calibration operations). Benefits of adaptively determining and adjusting the amount of charge to bleed away from a pixel sensor signal in accordance with the invention (either passively via a line-hold delay signal in accordance with FIGS. 7 and 8, or actively via a discharge signal in accordance with FIGS. 9 and 10) may include significantly reducing the noise level of captured images. This, in turn, can improve (increase) a camera's dynamic range. A further benefit of the invention is that in accordance with the above equation, is independent of gain, pixel sensor integration time, and temperature. Thus, the inventive technique is beneficial over a wide range of operating conditions and may, particularly, extend the temperature range over which a camera may be used while maintaining acceptable image quality.

Various changes in the materials, components, circuit elements, as well as in the details of the illustrated operational method are possible without departing from the scope of the claims. For instance, elements of the illustrative camera of FIG. 2 may be embodied in discrete logic elements, or combined into one or more application specific integrated circuits (ASIC). Further, the invention is not limited in application to portable PC cameras, but may be used in any digital imaging system. In addition, acts in accordance with FIG. 8 may be performed by a programmable control device executing instructions organized into a program module. In one embodiment, the programmable control device is processor 222. In another embodiment, the programmable control device is a custom designed state machine capable of executing microcode stored in a memory. Storage devices suitable for tangibly embodying program instructions include all forms of non-volatile memory including, but not limited to: semiconductor memory devices such as non-volatile RAM (e.g., memory 206), EPROM, EEPROM, and flash devices (e.g., memory 210); magnetic disks (fixed, floppy, and removable); other magnetic media such as tape; and optical media such as CD-ROM disks.

What is claimed is:

1. A method to reduce the effect of noise in an imaging system comprising:
   accumulating charge during image capture, the accumulated charge comprising a noise charge and an image charge;
   discharging, for a time, a portion of the noise charge to generate a pixel sensor signal, wherein the time is determined in accordance with the following:
      specifying a value for each of a plurality of parameters;
      acquiring the plurality of dark images, each dark image represented by a dark image signal and having an associated signal output value;
      solving a specified relation using the associated signal output values;
      specifying a target offset signal value; and
      solving the specified relation for the time; and
   digitizing the pixel sensor signal.

2. The method of claim 1, wherein the discharging comprises passively delaying the act of digitizing following the act of accumulating.

3. The method of claim 2, wherein the time is between approximately 0.001 milliseconds and approximately 10 milliseconds.

4. The method of claim 1, wherein discharging comprises actively bleeding a portion of the accumulated charge.

5. The method of claim 4, wherein actively bleeding a portion of the accumulated charge comprises activating a transistor.

6. The method of claim 1, wherein the specified relation is described in accordance with the following equation:

$$X=[\alpha_1+(\beta_1 T_{int}G)]+\tau[\alpha_2+(\beta_2 T_{int}G)],$$

wherein $T_{int}$ represents a sensor signal integration time value, G represents a sensor signal amplification value, $\tau$ represents a delay period value, $\alpha_1$, $\alpha_2$, $\beta_1$, and $\beta_2$ are constants, and X represents an associated signal output value.

7. The method of claim 6, wherein at least four dark images are acquired and, using the four associated signal output values, solving the specified relation to determine values for $\alpha_1$, $\alpha_2$, $\beta_1$, and $\beta_2$.

8. The method of claim 7, wherein the time is determined in accordance with the specified relation and in light of the determined values for $\alpha_1$, $\alpha_2$, $\beta_1$, and $\beta_2$ and the specified target offset signal value.

* * * * *